United States Patent
Redmann (10) Patent No.: US 10,141,869 B2
(45) Date of Patent: Nov. 27, 2018

(54) IMPEDANCE COMPENSATION

(71) Applicant: DET International Holding Limited, Grand Cayman (KY)

(72) Inventor: Michael Redmann, Freiburg (DE)

(73) Assignee: DET International Holding Limited, Grand Cayman (KY)

( * ) Notice: Subject to any disclaimer, the term of this patent is extended or adjusted under 35 U.S.C. 154(b) by 0 days.

(21) Appl. No.: 14/802,731

(22) Filed: Jul. 17, 2015

(65) Prior Publication Data

US 2016/0028325 A1 Jan. 28, 2016

(30) Foreign Application Priority Data

Jul. 23, 2014 (EP) .................................... 14405056

(51) Int. Cl.
| | |
|---|---|
| *H02M 7/537* | (2006.01) |
| *H02M 7/5387* | (2007.01) |
| *G05F 1/44* | (2006.01) |
| *H02J 3/12* | (2006.01) |
| *H02J 3/38* | (2006.01) |

(52) U.S. Cl.
CPC .......... *H02M 7/53871* (2013.01); *G05F 1/44* (2013.01); *H02J 3/12* (2013.01); *H02J 3/383* (2013.01); *Y02E 10/563* (2013.01)

(58) Field of Classification Search
CPC ...... H02M 7/521; H02M 7/53871; H02J 3/46; H02J 3/383; H02J 3/12

(Continued)

(56) References Cited

U.S. PATENT DOCUMENTS

| | | | |
|---|---|---|---|
| 1,876,451 A | 9/1932 | Telefunken | |
| 5,343,382 A * | 8/1994 | Hale | H02M 7/53871 318/599 |

(Continued)

FOREIGN PATENT DOCUMENTS

| | | |
|---|---|---|
| EP | 2 437 387 A2 | 4/2012 |
| JP | 2010226820 A | 10/2010 |

(Continued)

OTHER PUBLICATIONS

S.A.Saremi Hesari, S A et al, "Performance Assessment of an Impedance Based Islanding Detection Method in a Distribution Network with Multiple PV Inverters", Power and Energy System (ICPS), 2011 International Conference on, IEEE, Dec. 22, 2011, p. 1-6, XPO32118630.

(Continued)

*Primary Examiner* — Timothy J Dole
*Assistant Examiner* — Sisay G Tiku
(74) *Attorney, Agent, or Firm* — Vector IP Law Group; Robert S. Babayi (57) ABSTRACT

The invention relates to a method for operating a power converter (1), preferably a solar inverter, for feeding a load current ($I_{load}$) into a grid (3). The method includes the steps of determining the load current ($I_{load}$), monitoring an output voltage ($U_{out}$) of the power converter (1), and controlling the load current ($I_{load}$), to avoid that the output voltage ($U_{out}$) exceeds a voltage limit ($U_{out,lim}$), wherein the voltage limit ($U_{out,lim}$) is adjusted in dependency of the load current ($I_{load}$). Furthermore the invention relates to a corresponding power converter (1) for connecting to a grid (3), preferably it relates to a solar power converter. This power converter (1) includes a load current sensor (142), an output voltage sensor (143) and a load current controller (141).

17 Claims, 8 Drawing Sheets

(58) Field of Classification Search
USPC .................................. 363/78, 79, 80, 95, 97
See application file for complete search history.

(56) References Cited

U.S. PATENT DOCUMENTS

| | | | | |
|---|---|---|---|---|
| 6,037,758 | A * | 3/2000 | Perez .................. | G05F 1/67 307/64 |
| 6,542,791 | B1 * | 4/2003 | Perez .................. | G05F 1/67 307/66 |
| 6,889,122 | B2 * | 5/2005 | Perez .................. | G05F 1/67 307/66 |
| 9,042,134 | B2 * | 5/2015 | Liu .................. | H02M 1/12 363/40 |
| 2003/0155813 | A1 * | 8/2003 | Walter ............. | H02M 5/458 307/31 |
| 2011/0032734 | A1 * | 2/2011 | Melanson .......... | H02M 1/14 363/37 |
| 2011/0101937 | A1 | 5/2011 | Dobkin et al. | |
| 2012/0075898 | A1 * | 3/2012 | Sigamani ............. | G05F 1/67 363/131 |
| 2013/0033103 | A1 | 2/2013 | McJunkin et al. | |
| 2013/0155735 | A1 * | 6/2013 | Ilic .................. | H02M 7/72 363/71 |
| 2015/0229202 | A1 * | 8/2015 | Varigonda ............ | H02M 1/32 323/282 |

FOREIGN PATENT DOCUMENTS

| | | |
|---|---|---|
| WO | 2010/090538 A1 | 8/2010 |
| WO | 2012/018268 A1 | 2/2012 |

OTHER PUBLICATIONS

European Patent Office Search Report, dated Feb. 5, 2015, 10 pages, Application No. EP 14405056.4.
Budhia M et al: "A new IPT magnetic coupler for electric vehicle charging systems", IECON 2010—36th Annual Conference on IEEE Industrial Electronics Society, IEEE, Nov. 7, 2010 (Nov. 7, 2010), pp. 2487-2492, NJ, USA.
Masato Chigira et al: "Small-size light-weight transformer with new core structure for contactless electric vehicle power transfer system", Energy Conversion Congress and Exposition (ECCE), 2011 IEEE, IEEE, Sep. 17, 2011, pp. 260-266.
European Patent Office Communication Pursuant to Article 94(3) EPC, dated Jul. 9, 2015, Application No. 13 405 058.2.
European Search Report dated Apr. 16, 2018, 9 pages, EP Application No. 17 19 9955.

* cited by examiner

IMPEDANCE COMPENSATION

TECHNICAL FIELD

The invention relates to a method for operating a power converter, preferably a solar inverter, for feeding a load current into a grid. The method includes the steps of determining the load current, monitoring an output voltage of the power converter, and controlling the load current to avoid that the output voltage exceeds a voltage limit.

Furthermore the invention relates to a corresponding power converter for connecting to a grid, preferably it relates to a solar power converter. This power converter includes a load current sensor, an output voltage sensor and a load current controller.

BACKGROUND ART

State of the art power converters feeding a load current into a grid usually have a fix voltage limit for a maximally permissible operation voltage in order to protect the connected grid as well as the connection between the power converter and the grid from overvoltage. When feeding current into the grid the power converter's output voltage is always higher than the voltage at the grid connection point due to line impedance. The output voltage may exceed the voltage limit while the grid voltage still being in an acceptable level. In this case the power converter will shut down and not deliver its nominal power. One known method to circumvent this problem is the use of line impedance compensation systems.

The US2013/0033103 A1 (MC. Junkin et al.) discloses systems and methods for impedance compensation in subsea power distribution systems. These systems and methods include a plurality of impedance compensation devices comprising passive elements as resistors, diodes, capacitors and inductors, a controller to control the operation of those power compensation devices and detectors to detect especially electrically parameters, associated with the subsea power distribution system.

The disclosed systems and methods according to the US2013/0033103 allow for eliminating the effect of line impedances, however additional hardware is required.

SUMMARY OF THE INVENTION

It is the object of the invention to create a method pertaining to the technical field initially mentioned, which allows for the efficient use of the available output power of the power converter while avoiding additional hardware costs.

The solution of the invention is specified by the features of claim 1. According to the invention the voltage limit is adjusted in dependency of the load current.

The power converter monitors the output voltage and controls the load current such that the output voltage does not exceed the voltage limit. Herein the notion controlling may include a switching off of the load current and/or the power converter but also controlling a load current such that it follows a reference value in general or a load current reference value in particular. For this purpose a current controller is provided which usually includes a feedback control of the load current by manipulating an actuating means, as for instance a PWM modulator. The load current reference value can also be zero Amperes (0 A).

Such a method has the advantage that different output voltage limits can be set in dependency of the load situation of the power converter. The advantage is that the power converter is able to exploit its power capacity efficiently in a wider operating range and is less dependent on the quality of the grid connection. In addition no additional hardware is required.

The adjustment of the voltage limit can be done in various ways, for example by the step of defining a look up table attributing a voltage limit for each load current value and the step of adjusting the voltage limit for a given load current according to the look up table.

A special case of this embodiment is given when the adjusted voltage limit is defined to be constant for all load current values. In another embodiment a two dimensional look up table may be defined, also comprising the grid voltage as an independent variable. This embodiment also comprises the step of determining the actual grid voltage and adjusting the voltage limit according to the look up table.

In a preferred embodiment the adjustment of the voltage limit comprises the steps of determining a voltage correction value and adding the voltage correction value to a grid voltage limit. The grid voltage, usually maintained by the utility fluctuates in a defined tolerance band, the upper limit of this tolerance band is designated as the grid voltage limit. The advantage of this embodiment is that the voltage limit is not dependent on the actual grid voltage, and monitoring of the grid voltage is not necessary. So no additional voltage sensor is required, moreover, the correction term can more easily be defined.

In a further preferred embodiment of the invention the voltage correction value is determined by estimating a voltage drop due to a line impedance of a line between the power converter and the grid. The line impedance between the power converter output and the grid connection point may also be nonlinear in dependency of the load current. The finding that the correction value is related to the voltage drop due to the line impedance simplifies the determination of the voltage correction value. The estimation of the voltage drop can also be achieved by deriving models of the line impedance describing the relation between the load current and the voltage drop and/or by using identification methods involving measurements of the physical parameters and then by applying the load current to the model. There are many methods known in the state of the art which can be used to get a model of the line impedance. A well-known method is for instance the method of linear regression in the case of a linear line impedance.

The line impedance and per consequence the voltage drop depends on the network frequency and can therefore vary with frequency variation of the system voltage. It can also be time variant because of temperature fluctuations, changes of the state of the transmission line, for instance by switching on or off components within the path between the output and the grid connection point. All these changes can also be considered in the step of estimating the voltage drop. If state changes are considered the power converter may switch between different models stored in its memory in order to estimate the voltage drop.

By estimating the voltage drop due to the line impedance the influence of the line impedance on the overvoltage of the output voltage can be almost completely or at least to a large extent compensated by adjusting the voltage limit.

In a further preferred embodiment the method of estimating the voltage drop includes the steps of injecting test currents into the line, measuring the output voltage of the power converter for each test current and identifying the line impedance. The power converter has the means for injecting the test currents and to measure the output voltage. Those values are sufficient to identify the line impedance as long as the grid voltage is stable during the measurement. The voltage drop can be determined by applying the load current to the line impedance and measuring the output voltage. If the power converter is a DC-to-AC or an AC-to-AC power converter the test currents are preferably alternating currents, which are constant in amplitude and frequency. The frequency of the alternating currents is preferably chosen to be similar to the utility frequency of the grid.

In a further embodiment the power converter is an AC-DC or a DC-DC power converter and the test currents are preferable DC-currents.

In a further embodiment of the invention at least two tuples of the output voltage and load current are measured during ordinary operation of the power converter and the line impedance is estimated from that data.

In another method the grid voltage is measured in addition to the output voltage when injecting the test current. Thus the voltage drop can be directly measured as difference between the output voltage and the voltage drop and only one measurement point respectively one tuple of the output voltage and the load current is required in order to identify the line impedance.

In another embodiment non constant respectively time varying test currents are injected into the grid. It might be advantageous for example to inject test currents which follow pseudo-binary random signals or sine-sweep signals in order to gain also the phase information of the line impedance in an efficient way.

The identification process typically is executed before activating the voltage limit adjustment according to the invention or during commissioning of the adaption method. It should be repeated every time when the customers installation is subjected to alterations which could cause a modification of the line impedance, for instance after installation of new electrical devices in the network. Also when switching on or off of a device in the network, the line impedance could change. In such a case it might be considered to store the results of the identification process in a memory of the power converter and to retrieve the impedance value depending on the state of the network.

In another embodiment the estimation process will be executed at a given time interval either manually or automatically. A timer could be used to supervise the time interval if the estimation process has to be started manually. If the time interval has been exceeded the adjustment of the voltage limit could be switched off automatically. On the one hand the length of the time interval preferably has to be chosen in accordance to the frequency of changes respectively modifications of the customer installation. On the other hand it might be adapted to a periodicity of the provided input power, for instance to the daily changes of sun activity in the case of a solar inverter and/or the load of the grid, which is also submitted to daily fluctuations.

In a further preferred embodiment the voltage drop is estimated as linear dependent on the load current. This signifies that also the line impedance is linear which is in most cases sufficient to estimate the voltage drop due to the line impedance. The advantage is that the identification of the line impedance and also the estimation of the voltage drop is very simple and can be performed very efficiently.

In a further embodiment at least one test current is zero. When a test current is zero, respective output voltage represents the open circuit voltage. The open circuit voltage corresponds to the grid voltage as the output voltage for this test current depends only on the grid voltage. If more than one test current equal to zero are injected, it allows to detect grid voltage fluctuation between the measurements and to compensate for that fluctuation or to invalidate the measurement.

In another embodiment all injected test currents are different from zero. A linear line impedance can also be identified if at least two measurement points with two different current values are available, for instance two test currents or one test current and a load current with different amplitudes. Once the line impedance is identified, also the grid voltage can be deduced by extrapolating the voltage drop for a load current of 0A. An advantage of this embodiment is that the power converter can feed current into the grid also during the injection of test currents. Another advantage of this embodiment is that a shorter time interval between the measurements can be achieved as the settling time for the different impressed currents will be reduced due to a smaller amplitude range between the load current and the test currents.

Advantageously the method comprises the step of injecting three consecutive test currents at equally spaced time intervals. The first test current will be set to zero, the second test current to a value between 60% and 95% of the load current before the test, preferably between 75% and 85% of the load current and the third test current to zero again. The time interval between the injections of the test currents will be chosen in a range of 10 ms to 2500 ms, preferably between 100 ms and 500 ms.

The advantage of this method is that it comprises only three measurement points. As the open circuit voltage is measured twice, false measurements due to grid variations can be detected and per consequence also compensated. If the variation of both measurements exceeds a predefined limit, for example 0.5% of a nominal grid voltage, the test can be defined as invalid. By taking equidistant time intervals a constant grid voltage drift during measurement can be easily reduced by taking the arithmetic mean value of both open-circuit voltage measurements. The time between the measurements should be long enough to calculate a RMS-value of the output voltage respectively the test current, but short enough, to keep the total measurement short. A short measurement time also keeps the variation of the grid voltage short. The second test current should be constant during the measurement what implies that it should be smaller than the actual current before the test, e.g. 80%. Under normal load condition the load current is subject to variations what is usually not desirable during the test. On the other hand, the test current should still be high enough in order to minimize the influence of measurement errors, as for instance measurement noise.

Alternatively also other measurement sequences could be selected. For instance only the open circuit voltage might be measured while the second measurement is taken during normal operation before the measurement.

In an advantageous embodiment the voltage correction value is scaled such that the output voltage does not exceed a maximum output voltage of the power converter. By adjusting the maximum voltage in dependency of the load current in order to compensate for the voltage drop due to the line impedance, the output voltage may exceed the maximum output voltage of the power converter. The maximum output voltage of the power converter is among other things imposed by technical constraints or technical regulations.

The step of scaling may be linear or non-linear with the load current. Non-linear scaling may be advantageously considered if the estimated voltage drop is non-linear. Linearly scaling of the output voltage limit however is very simple to implement and especially to parameterize during commissioning. Alternatively the voltage correction value might be defined by the minimum of the maximum output voltage and the estimated voltage drop due to the line impedance.

In a further preferred embodiment the step of controlling the load current includes the step of defining a limiting characteristics of the load current in dependency of the output voltage. Below a first output voltage level the limiting characteristics of the load current is equal to the nominal load current. Between a first output voltage level and a second output voltage level this limiting characteristics has a negative gradient and covers a load current range between zero and the nominal load current. Above the second output voltage level, the limiting characteristics is zero. The first output voltage level is smaller than the second output voltage level and the second output voltage level is equal or smaller than the maximum output voltage of the power converter. The load current will be reduced if the output voltage exceeds the first voltage level, according to the limiting characteristics. Between the first and the second voltage level the load current will be further reduced with increasing output voltage, the limiting characteristics having a negative gradient between those voltages.

Above the second voltage level the current will be set to zero. It is also possible to switch the power converter off if the second voltage level has been reached, or to switch it off, after a third voltage level, which is higher than the second voltage level, has been reached.

The limiting characteristics defines a limit of the load current in function of the output voltage. Limiting the load current in function of the output voltage also has the effect of limiting the output power of the power converter in function of its output voltage. The advantage of this embodiment is that it provides a method of controlling the load current in function of the output voltage such that it prevents increasing the output voltage due to the line impedance between the output of the power converter and the grid and prevents the power converter from shutting down or switching off. The converter will still feed current into the grid without exceeding the voltage limit, though the load current will be reduced.

Another embodiment also provides a timer function, which shuts down the power converter if the output voltage exceeds the second voltage level for a predetermined time.

Alternatively the load current can be set to zero or even shut down immediately after the first voltage level has been exceeded.

In a further preferred embodiment, the limiting characteristics between the first output voltage level and the second output voltage level is chosen to be linear, respectively said negative gradient is constant. The advantage of this embodiment is that the implementation is very simple.

In an alternative embodiment the negative gradient between the first and the second voltage level may be variable. This may be advantageous in the case of a non-linear line impedance.

Still, in another embodiment, the limiting characteristics vary in a stepped respectively non-continuous manner between the first and the second input level instead of having a continuous negative gradient, wherein the levels of the steps are decreasing with the increasing output voltage. In a further embodiment of the invention, the limiting characteristics may very continuously with piecewise constant gradients.

The activation of the above mentioned load current reduction respectively power reduction in function of the output voltage can also be activated independently from the adaption of the output voltage limit.

Preferably, controlling the load current includes the step of adjusting the load current stepwise to meet the limiting characteristics by generating intermediate load current reference values. The output voltage is a function of the load current, wherein the function comprises the grid voltage and the line impedance as parameters. For a given grid voltage and a given line impedance, the relation between the load current and the output voltage defines a load current characteristics which intersects the limiting characteristics in a current-voltage plane. The intersection point between both characteristics represents a steady state point with a steady state load current and a steady state output voltage where the system will converge to, if it is stable.

In a possible embodiment of the invention, the load current is adjusted directly to meet the limiting characteristics by measuring the grid voltage, calculating the steady state load current which meets the limiting characteristics, generating a load current reference value equal to the steady state load current and controlling the load current to reach the steady state load current. A disadvantage of this operation method is, that the actual grid voltage has to be measured which is typically very costly, if at all possible.

Usually the grid voltage is not available and therefore also the steady state load current, respectively the steady state point, where the load current and the output voltage will converge to if the system is stable, are not known.

In addition, the adaption of the load current will not have an immediate effect due to physical constraints respectively physical time constants. Examples of them are inductances in the load current path and time lags in a control circuit of the power converter. Per consequence the load current reduction is preferably not applied instantaneously, but in iterative steps. The step-size and the step-time have to be adapted to the system, for instance to the gradient of the limiting characteristics between the first and the second voltage level. In a preferred embodiment the step-by-step adaption of the load current is obtained by iteratively calculating an intermediate load current reference value considering the actual load current value and the load current reduction for the present output voltage according to the limiting characteristics. This embodiment allows reaching the steady state load current very fast under the condition that the system is well tuned. In a further embodiment the intermediate load current reference value of an adjusting step is given by the load current reduction for the present output voltage according to the limiting characteristics. This embodiment is very simple to implement but stability only can be achieved by adapting the gradient of the limiting characteristics. In another embodiment a digital filter is inserted. The digital filter is considering the load reference value of precedent steps and the load current reduction for the actual output voltage, such that an intermediate load reference value is generated and the adaption of the load reference values is smoother.

In a preferred embodiment the intermediate load current reference values $I_{load,ref}$ are determined by the formula:

$$I_{load,ref} = \left(1 - \frac{U_{out} \cdot I_{nom} - U_{100\%} \cdot I_{load}}{U_{out} \cdot I_{nom} + (U_{0\%} - U_{100\%}) \cdot I_{load}}\right) \cdot I_{nom},$$

$U_{0\%}$ being the first output voltage level, $U_{100\%}$ being the second output voltage level, $I_{load}$ being the actual load current, $U_{out}$ the actual output voltage, and $I_{nom}$ the nominal load current of the power converter. This formula is obtained by stepwise calculating the steady state point under the assumption that the grid voltage is 0 V. In this preferred embodiment of the invention the load current reference values are generated such that the load current automatically converges towards the steady state point without oscillations.

For a linear gradient of the limiting characteristics a stable behaviour with no oscillations is achieved.

In a further preferred embodiment the first output voltage level and the second voltage level are adapted in dependency of the voltage limit.

If the load current is changing, the voltage limit will be adjusted. In order to take advantage of the adjustment of the voltage limit, preferably also the first and second voltage level have to be shifted with the voltage limit variation respectively the whole characteristics has to be shifted with the voltage limit. In a further preferred embodiment the first voltage level is equal or in the range of the output voltage limit. The second voltage level has a constant distance from the first voltage level. The distance between the first and the second voltage level is chosen such that the gradient of the limiting characteristics is greater than the gradient of the load current characteristics. If for instance the grid voltage increases, the effect of the load current reduction due to the limiting characteristics is more important than the effect of the decreasing voltage limit, due to a decreasing load current. The load current will be reduced such that the power converter will not switch off. The advantage of the embodiment is that the power converter stays connected to the grid and does not have to shut down and reconnect to the network.

In an alternative embodiment the first and the second voltage level are kept constant. In this case the load current reduction works independently of the voltage limit adjustment. The consequence is that the power converter may shut down for a certain load current range if the output voltage exceeds the output voltage limit.

Generally, the first or the second voltage level can be kept constant or the first and the second voltage levels can be shifted by different values in dependency of the voltage limit.

The invention also relates to a power converter for connecting to a grid, preferably a solar power converter, including a load current sensor, an output voltage sensor and a load current controller for performing the step of adjusting the voltage limit in dependency of the load current. The advantage of this embodiment is that the power converter is able to exploit its power capacity efficiently in a wider operating range and is less dependent on the quality of the grid connection. Other advantageous embodiments and combinations of features come out from the detailed description below and the totality of the claims.

BRIEF DESCRIPTION OF THE DRAWINGS

The drawings used to explain the embodiments show.

In the figures, the same components are given the same reference symbols.

PREFERRED EMBODIMENTS

Figure 1:
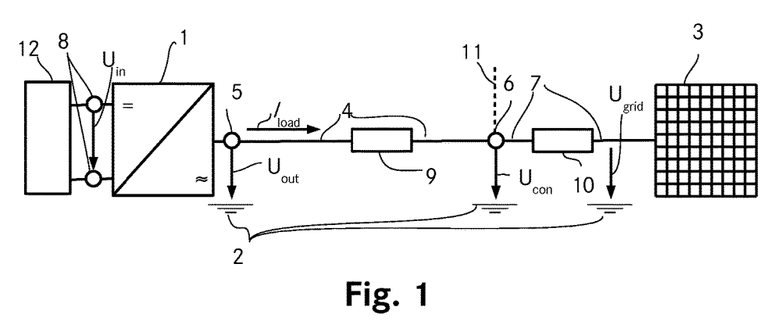
FIG. 1 Schematic diagram of a power converter feeding a load current into a grid.

FIG. 1 shows schematically a power converter 1 according to the invention, feeding a load current $I_{load}$ into a grid 3. In this embodiment, the power converter 1 is fed by a DC voltage source 12 with a DC voltage $U_{in}$ which is connected to the input 8 of the power converter 1, for instance a photovoltaic system. The power converter 1 outputs an output voltage $U_{out}$ to the grid 3, the output voltage $U_{out}$ being an AC voltage. In another embodiment the power source also can be an AC source, for instance a wind turbine connected to a generator. It is also possible that the power converter 1 feeds a DC current into the grid 3. The line where the load current is fed into the grid can be split in two parts: a dedicated lead wire 4, which connects the output 5 of the power converter 1 to a grid connection point 6 and a grid side connection network 7, which connects the grid connection point 6 to the grid 3. The dedicated lead wire 4 usually belongs to the installation of the customer.

The impedance of the lead wire 4 and the line impedance of the grid side connection network 7 may be represented by lumped elements, namely a line impedance 9 and a grid side line impedance 10. At the grid connection point 6 also other installations of the customer 11 may be connected to the grid (dashed line). Due to the line impedance 9 and the grid side line impedance 10, the output voltage $U_{out}$ of the power converter is higher than a voltage $U_{con}$ at the grid connection point 6 and a grid voltage $U_{grid}$ at the input of the grid in reference to a ground 2 as common voltage reference. In this text the subscript "out" is used, when referring to a voltage at the output 5 of the power converter 1, the subscript "grid" when referring to a grid voltage while the subscript "con" is used when referring to a voltage at the grid connection point. A further index "lim" is used to indicate a limitation of the output voltage at the output 5 of the power converter 1, "nom" if the output voltage is obtained when applying the nominal current. In contrast to "lim" the subscript "limit" is used when speaking about a steady state condition. The subscript "max" designates a maximum of a certain voltage value.

Figure 2:
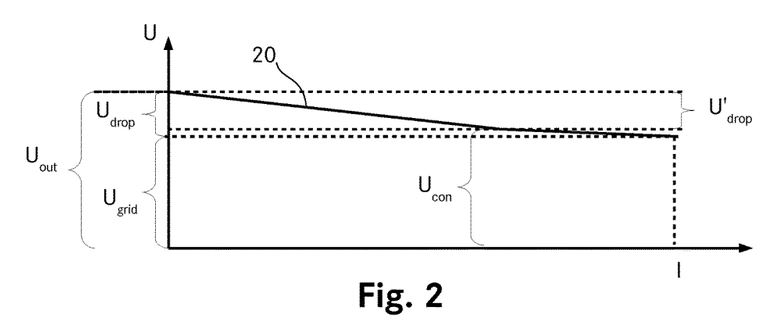
FIG. 2 Voltage characteristics over distance for a connection between the power converter and the grid.

FIG. 2 shows a typical voltage characteristics 20 over distance l for a connection between the power converter output 5 and the grid 3 for a given load current $I_{load}$.

When feeding the load current $I_{load}$ into the grid 3 the output voltage $U_{out}$ of the power converter is always higher than the grid voltage $U_{grid}$. Starting at the power converter output 5 with the output voltage $U_{out}$ the voltage drops to the voltage $U_{con}$ at the grid connection point 6. The voltage drops further from the grid connection point 6 to the grid 3 to the grid voltage $U_{grid}$. As the lead wire 4 usually has a poor line impedance 9 compared to the grid side connection network 7, the voltage drop $U'_{drop}$ over the lead wire 4 is typically significantly much more important than the voltage drop over the grid side connection network 7 and contributes therefore the major part of the voltage drop $U_{drop}$ between the output 5 of the power converter 1 and the grid 3. Thus the line impedance 9 also represents the major part of the impedance given by the sum of the line impedance 9 and the grid side line impedance 10. Though the voltage drop is piecewise linear between the power converter 1 and the grid 3, the voltage drop may also be non-linear in dependency of the system. Also it may be distributed over more than two piecewise linear subsections, as the line itself can consist of different conductor sections, connected in series and/or parallel.

Due to national regulations the voltage $U_{con}$ at the grid connection point 6 must not exceed the maximum allowed grid voltage $U_{grid,max}$. A purpose of this limit is to avoid that electrical loads in the public network are damaged due to over voltage. In Germany, for instance, the voltage limit for low voltage networks with a nominal voltage of 230 V is 10% over the nominal voltage, respectively $U_{grid,max}$=253 V.

Figure 3:
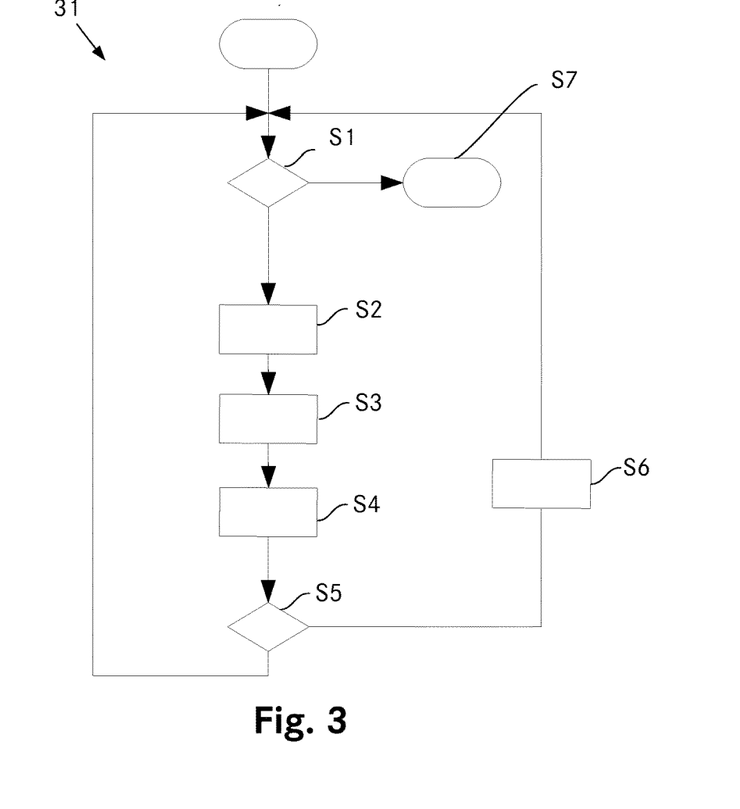
FIG. 3 Flow chart of an illustrative operation method according to the invention.

In a first embodiment of the invention, the voltage limit of the power converter 1 $U_{out,lim}$ (t) is adapted in dependency of the load current $I_{load}$ (t). FIG. 3 shows a flow chart 31 of the operation method according to the invention.

The operation method enters at step S1 into a repetitive loop which includes the Steps S1-S6. In step S1 the run condition of the power converter 1 is checked. If the run condition is TRUE, the power converter stays in the iterative loop and continues with step S2. Otherwise, if the run condition is FALSE, it will continue with step S7 and stop or switch off. When staying in the iterative loop, the subsequent step S2 is executed, which includes the step of measuring the load current $I_{load}(t)$. The measurement may for instance be performed by an integrated current sensor of the power converter 1. In the next step, S3, a voltage correction value is determined as a function of the time dependent load current $I_{load}(t)$. When the line impedance 9 (Z) is known, the load current depending voltage drop can be determined by applying the term $U_{drop}(t)=Z\cdot I_{load}(t)$, where Z represents the line impedance 9. Then, in the succeeding step, S4, the voltage limit $U_{out,lim}$ is adjusted by adding the load current depending voltage drop $U_{drop}(t)$ to the maximum grid voltage $U_{grid,max}$:

$$U_{out,lim}(t)=U_{grid,max}+Z\cdot I_{load}(t)$$

It is also possible, that the impedance Z is not linear in dependency of the load current $I_{load}$. In this case the output voltage might preferably be adapted to $$U_{out,lim}(t)=U_{grid,max}+Z(I_{load})\cdot I_{load}(t),$$

considering the non-linearity of the impedance.

In the subsequent step, S5, the output voltage $U_{out}(t)$ is monitored in reference to the voltage limit $U_{out,lim}(t)$. If the output voltage $U_{out}(t)$ exceeds the voltage limit $U_{out,lim}(t)$, the load current $I_{load}$ is adjusted in step S6 such that the output voltage does not exceed the voltage limit$_{out,lim}(t)$, before returning to step S1, otherwise step S1 is executed directly.

In a preferred embodiment according to the invention adjusting the load current in S6 may also include switching off or shutting down the power converter respectively setting the run condition to FALSE.

Figure 4:
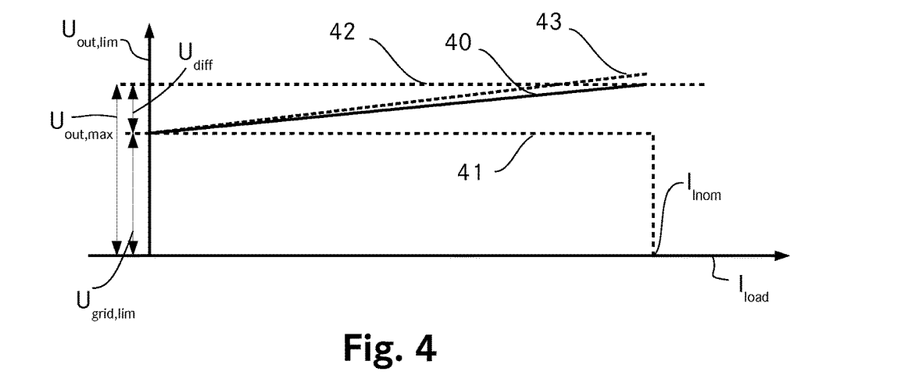
FIG. 4 Voltage limit characteristics of an illustrative embodiment of the invention.

FIG. 4 shows a voltage limit characteristics 40 in function of the load current $I_{load}$ of a further embodiment of the invention. The grid voltage limit 41 and the maximum output voltage $U_{out,max}$ 42 of the power converter 1 are depicted in the graph by dashed lines. An unscaled voltage limit characteristics 43 shows a curve of the previous mentioned embodiment of the invention where the voltage correction value is determined such that it compensates a measured line impedance, the unscaled voltage limit characteristics 43 having a gradient equal to the line impedance 9. In this case the maximum output voltage $U_{out,max}$ 42 of the power converter 1 would be exceeded for a load current $I_{load}$ close to the nominal load current $I_{nom}$.

In addition, the line impedance 9 might not be known precisely, or only the sum of the line impedance 9 and the grid side line impedance 10 (FIG. 1). A preferred embodiment of the invention therefore provides the scaling of the voltage correction value such that the output voltage limit $U_{out,lim}$ 40 of the power converter 1 may not exceed the maximum output voltage $U_{out,max}$ 42 of the power converter 1, for the entire load current range up to the nominal load current $I_{nom}$.

A scaling factor c can be calculated by determining a maximum correction value $U_{diff}$, for the nominal load current $I_{nom}$, such that the maximum output voltage is reached or the line impedance 9 is entirely compensated.

The maximum correction value $U_{diff}$ for the voltage limit $U_{out,lim}$ 40 is given by the minimum between the estimated voltage drop due to the line impedance 9 at the nominal load current $I_{nom}$ and the difference between the maximum output voltage $U_{out,max}$ 42 of the power converter 1 and the maximum allowed grid voltage $U_{grid,max}$. This yields for the scaling factor c defined by the ratio between the maximum correction value $U_{diff}$ and the voltage drop $Z\cdot I_{nom}$ due to the line impedance Z at the nominal current $I_{nom}$:

$$C = \frac{U_{diff}}{Z\cdot I_{nom}} = \frac{\min(Z\cdot I_{nom}, U_{out,max} - U_{grid,max})}{Z\cdot I_{nom}}.$$

Assuming an output voltage limit of the power converter 1 of 282V and a grid voltage limit of 253 V, a nominal load current of 100 A and a line impedance 9 of 0.5Ω. The maximum correction value $U_{diff}$ equals then 29V, yielding a scaling factor c of 0.58. The voltage limit characteristics 40 is than defined by the following relation:

$$U_{out,lim}(t)=U_{max,grid}+c\cdot Z\cdot I_{load}(t)$$

The operation method of adapting the voltage limit is preferably activated when facing problems with over voltage due to a poor installation, resulting for instance from long distances of the power converter 1 to the grid connection point or if the connection wire has a low cross section. But it can also be activated during the installation of the power converter 1. In another embodiment the function is activated automatically after over voltage has been reached frequently, for instance more than once in 24 hours.

In a further embodiment of the invention the line impedance 9 is identified by injecting AC-test currents by the power converter.

Figure 5:
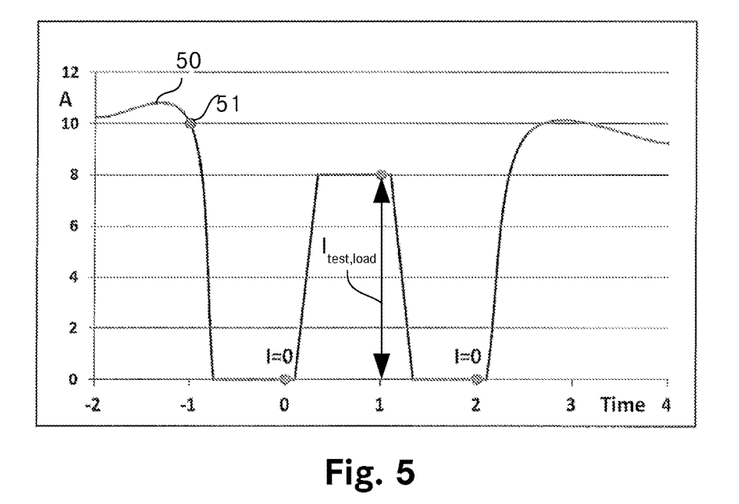
FIG. 5 A load current curve during injection of test currents according to the invention.

FIG. 5 shows a typical load current curve 50 of a preferred embodiment of the invention, where three consecutive test currents are injected by the power converter 1 into the grid 3, at equally spaced time intervals of 1 s.

Figure 6:
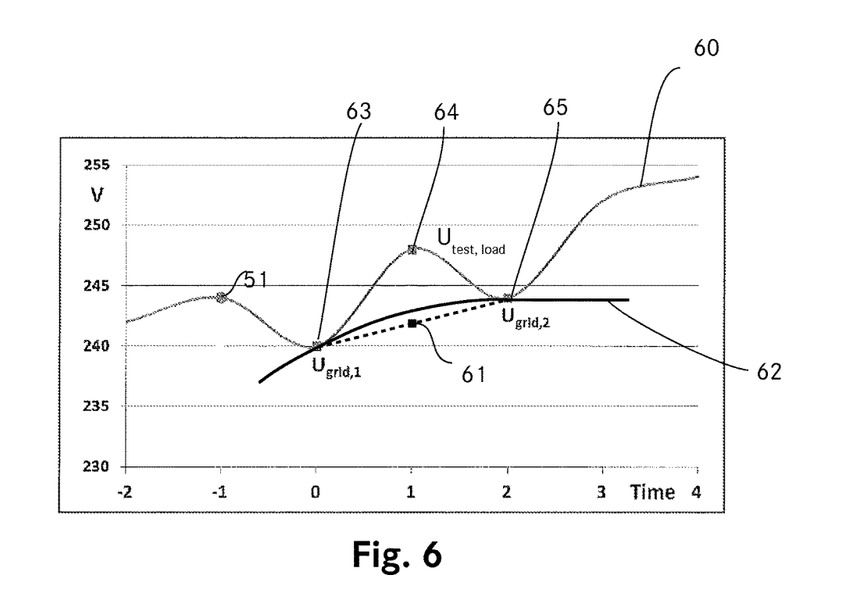
FIG. 6 An output voltage curve during injection of test currents according to the example shown in FIG. 5.

FIG. 6 shows the corresponding output voltage signal curve 60.

When feeding test currents into the grid, the output voltage $U_{out}$ of the power converter 1 changes. By comparing the output voltage $U_{out}$ of the power converter 1 for different test currents, the total impedance between the power converter 1 and the grid 3, respectively the sum of the line impedance 9 and the grid side line impedance 10 (FIG. 1), can be estimated. In most cases, the grid line impedance 10 only contributes a small part, respectively less than 10% to the measured voltage drop. In this case the voltage drop due to the grid side line impedance 10 can be neglected. Otherwise the contribution of the voltage drop of the grid side line impedance 10 can be considered by the previously mentioned scaling factor c.

Before the start of the measurement, in the time interval $-2\,s<t<-1\,s$, the load current $I_{load}$ varies in a range between 10 and 11 A. The variation of the load current $I_{load}$ is among other things due to changes of the supplied power at the input 8 of the power converter 1, for instance due to sun intensity changes if solar cells are connected to the power converter 1 or due to wind speed variations in the case that a wind turbine is connected to the power converter 1. With the start of the test sequence, at the start point of the measurement 51 at $t=-1\,s$ the load current $I_{load}$ of the power converter 1 is measured, which in this example is 10 A. The measurement time for the subsequent measurements should be long enough, allowing determining the RMS value of the load current $I_{load}$ and/or the output voltage $U_{out}$ accurately, consequently the measurement time should be at least one signal period. Public networks usually have utility frequencies between 50 and 60 Hz, such that the minimum measuring time for measuring the output voltage $U_{out}$ for each test current should be greater than 16 ms.

Then, after the measurement of the load current $I_{load}$ at $t=-1\,s$ the load current is switched off respectively a test current $I_{test}$ equal to zero is generated in order to measure a first open-circuit voltage 63 respectively a first grid voltage $U_{grid,1}$, after another second at $t=0\,s$. The time interval of one second is sufficiently long in order to allow the load current $I_{load}$ stabilizing at 0 A and measuring the first open-circuit voltage 63 respectively a first grid voltage $U_{grid,1}$, which is 240 V in our example (FIG. 6). After that, the test current $I_{test,load}$ is applied respectively generated by the power converter 1. The test current $I_{test,load}$ should be as high as possible to achieve reliable measurement data, but not come too close to the nominal load current $I_{nom}$, as the current has to be kept constant during the measurement interval, which is not guaranteed at the nominal load current $I_{nom}$. The test current $I_{test,load}$ should be at least 30% of the nominal load current level but not exceed 85% of the load current $I_{load}$ before the measurement. In the present example we have chosen a test current of 80% of the load current at the start of the measurement, respectively the test current $I_{test,load}$ is set to 8 A. Again, a time interval of 1 s is chosen, such that the test current has sufficient time to stabilize. The corresponding test load output voltage 64 is measured at $t=1\,s$, which is in our example $U_{test,load}=247.5\,V$ (FIG. 6).

Than the current is switched off respectively set to 0A and after another second, at $t=2\,s$, a second open-circuit voltage 65 respectively a second grid voltage $U_{grid,2}$ is measured (243V). The two measurement values permit, on one hand, to calculate an arithmetic mean of the grid voltage $U_{grid}$ 61 (FIG. 6, $U_{grid}=241.5\,V$). On the other hand, it is possible to validate the measurement by considering the variation of the grid voltage values, which has to be small for a precise measurement. The variation between the two measurement values should be less than 0.5% in reference to the nominal grid voltage. The variation of the grid voltage curve 62 over the whole measurement interval is depicted in FIG. 6. In addition it should also be verified if the test load output voltage 64 ($U_{test,load}$) is higher than the grid voltage $U_{grid}$ 61, for instance by 1%. The maximum voltage drop $U_{drop,max}$ due to the line impedance than can be calculated by taking the difference between the test load output voltage $U_{test,load}$ 63 and the arithmetic mean of the grid voltage $U_{grid}$ and scaling it to the nominal current $I_{nom}$:

$$U_{drop,max} = (U_{test,load} - U_{grid})\frac{I_{nom}}{I_{test,load}}$$

If the grid voltage $U_{grid}$ is submitted to a linear drift during the measurement, the drift has no adverse effect on the exact determination of the maximum voltage drop $U_{drop,max}$ and therefore also on the determination of the sum of the line impedance 9 and the grid side line impedance 10, as the time intervals between the measurements are equal.

Figure 7:
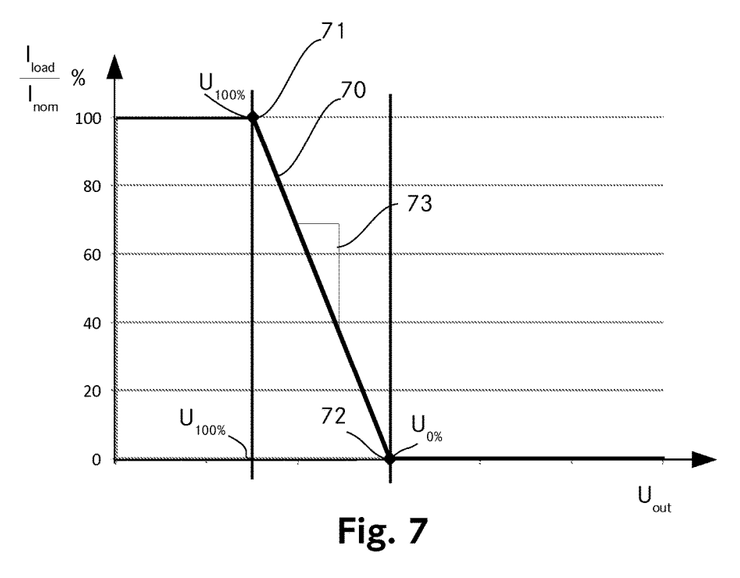
FIG. 7 Example of a limiting characteristics of the load current as a function of the output voltage, according to the present invention.

In a further embodiment of the invention the operation method includes a limiting characteristics 70 of the load current $I_{load}$ as a function of the output voltage $U_{out}$ of the power converter 1 according to FIG. 7, the load current $I_{load}$ being expressed in percentages of the nominal load current $I_{nom}$. The limiting characteristics 70 defines a limit of the load current $I_{load}$ in function of the output voltage $U_{out}$. Limiting the load current $I_{load}$ in function of the output voltage $U_{out}$, also has the effect of limiting the output power of the power converter 1 in function of its output voltage $U_{out}$. This function allows controlling the load current $I_{load}$ in function of the output voltage $U_{out}$ such that it prevents increasing the output voltage $U_{out}$ due to the line impedance 9 and the grid side line impedance 10 over the voltage limit $U_{out,lim}$ and prevents the power converter from shutting down or switching off. Consequently it also prevents that the voltage $U_{con}$ at the grid connection point 6 exceeds the maximum grid voltage $U_{grid,max}$. Up to the first voltage level 71 ($U_{100\%}$) the load current $I_{load}$ is limited by the nominal load current $I_{nom}$. The adjacent section between the first and the second voltage level $U_{100\%}$ and $U_{0\%}$ is linear, having a constant negative gradient 73. It starts at the first voltage level 71 ($U_{100\%}$) with a load current $I_{load}$ equal to the nominal load current $I_{nom}$ and ends at the second voltage level 72 ($U_{0\%}$) with a load current $I_{load}$ that equals 0 A. Also above the second voltage level 72 ($U_{0\%}$), the load current $I_{load}$ is limited to 0 A. The first voltage level 71 ($U_{100\%}$) should be above the nominal grid voltage $U_{grid}$, for instance above 230 V in Europe, and below the maximum output voltage $U_{out,max}$ of the power converter 1, for instance 282V. In this embodiment, the gradient 73 being constant, but according to the invention, the limiting characteristics can also be nonlinear between the first voltage level 71 ($U_{100\%}$) and the second voltage level 72 ($U_{0\%}$).

When the output voltage is above the second voltage level 72 ($U_{0\%}$), the load current ($I_{load}$) is reduced to 0 A. In this case, the power converter 1 does not switch off and can reconnect if the output voltage $U_{out}$ drops below the second voltage level 72 ($U_{0\%}$).

Figure 8:
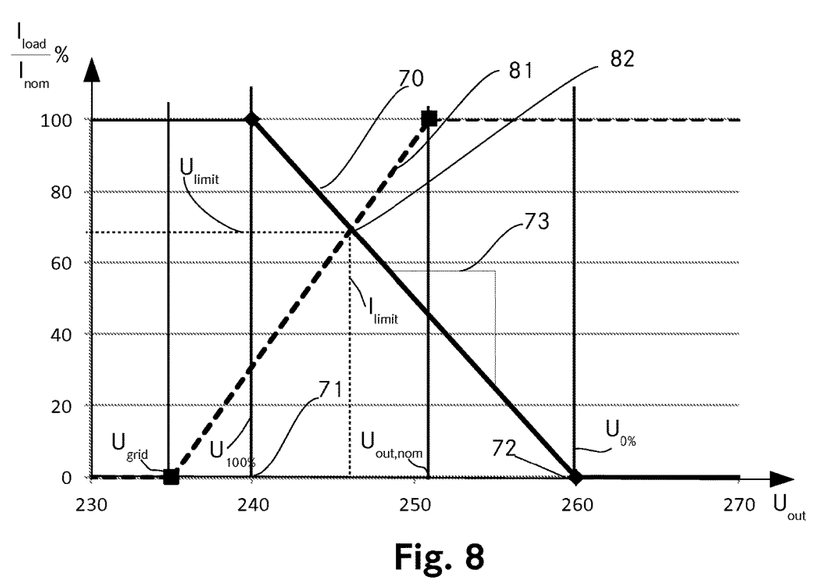
FIG. 8 Numerical example of determination of steady state point.

FIG. 8 shows an illustrative numerical example of the invention, with the first voltage level 71 at $U_{100\%}$=240 V and the second voltage level 72 at $U_{0\%}$=260V. These values may be set by the user and stored in the memory of the power converter. In addition to the current limiting characteristics 70, the output voltage $U_{out}$ to load current $I_{load}$ characteristics 81 of the power converter 1 has been depicted in the graph in a dashed line which represents the correlation between the output voltage $U_{ut}$ of the power converter 1 and the load current $I_{load}$ due to the line impedance between the power converter and the grid. For no load condition, respectively for $I_{out}$=0 A, the output voltage $U_{out}$ is equal to the grid voltage $U_{grid}$, which is 235 V in this example. The output voltage $U_{out,nom}$ for the nominal load current $I_{mom}$ is equal to 251 V.

When enabling the load current $I_{load}$ reduction and under the assumption that the operation method to reduce the load current $I_{load}$ as function of the output voltage $U_{out}$ is stable, the load current $I_{load}$ and the output voltage $U_{out}$ will converge towards the to the steady state point 82 which is defined by intersection between the current limiting characteristics 70 and the output voltage $U_{out}$ to load current $I_{load}$ characteristics 81, the steady state point having the coordinates ($U_{limit}$; $I_{limit}/I_{nom}$).

In a possible embodiment, the output voltage $U_{out}$ to load current $I_{load}$ characteristics 81 is known, respectively the grid voltage $U_{grid}$ and/or the gradient 73, the steady state point 82 having the coordinates ($U_{limit}$; $I_{limit}/I_{nom}$) can be directly determined by the step of performing the following calculations:

$$U_{limit} = \frac{U_{0\%} \cdot (U_{out,nom} - U_{grid}) + U_{grid} \cdot (U_{0\%} - U_{100\%})}{U_{out,nom} - U_{grid} + U_{0\%} - U_{100\%}};$$

$$\frac{I_{limit}}{I_{nom}} = \left(1 - \frac{U_{limit} - U_{100\%}}{U_{0\%} - U_{100\%}}\right)$$

Usually the grid voltage is not known such that the steady state point 82 can't be calculated directly, but has to be approached step wise.

Different embodiments providing a stepwise approximation of the steady state point 82 when the load current reduction respectively the power reduction function is activated will be discussed below.

Figure 9:
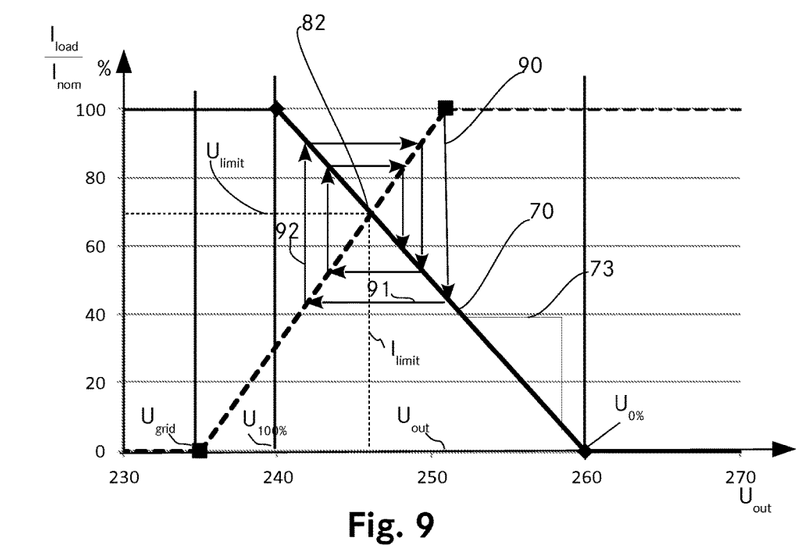
FIG. 9 Phase space diagram of load current and output voltage illustrating an embodiment of the operation method according to the invention.

In one embodiment of the invention, the load current reference value is directly adopted for each step to the value of the current limiting characteristics 70 corresponding to the actual output voltage $U_{out}$ (FIG. 9).

FIG. 9 shows the phase space diagram of the load current $I_{load}$ and the corresponding output voltage $U_{out}$ of the power converter in order to illustrate this embodiment of the operation mode. In the diagram the transitions of the load current $I_{load}$ and the output voltage $U_{out}$ are plotted for different steps of adjusting the load current. The power reduction function is activated while the power converter 1 is feeding a load current $I_{load}$ into the grid which equals 100% of the nominal load current $I_{nom}$, the output voltage being 251 V. The corresponding load current limit $I_{load,lim}$ for this output voltage $U_{out}$ is 45% of the nominal load current $I_{nom}$. Thus a load current reference value $I_{load,ref}$ is generated which equals 45% of the nominal load current $I_{nom}$, yielding that the converter will reduce the load current $I_{load}$ to 45% of the nominal load current $I_{nom}$, as shown in FIG. 9 (first transition 90). Reducing the load current to 45% reduces the output voltage $U_{out}$ to approximately 245 V (second transition 91). The corresponding load current limit $I_{load,lim}$ according to the current limiting characteristics 70 which corresponds to the output voltage $U_{out}$=245 V is approximately 87%. Consequently the load current reference value $I_{load,ref}$ will be set to 87% of the nominal load current $I_{nom}$ (third transition 92). In the following steps the load current and the output voltage $U_{out}$ will converge towards the steady state point 82 with the values $I_{limit}$=69.45 A and $U_{limit}$=246.11 V.

Figure 10:
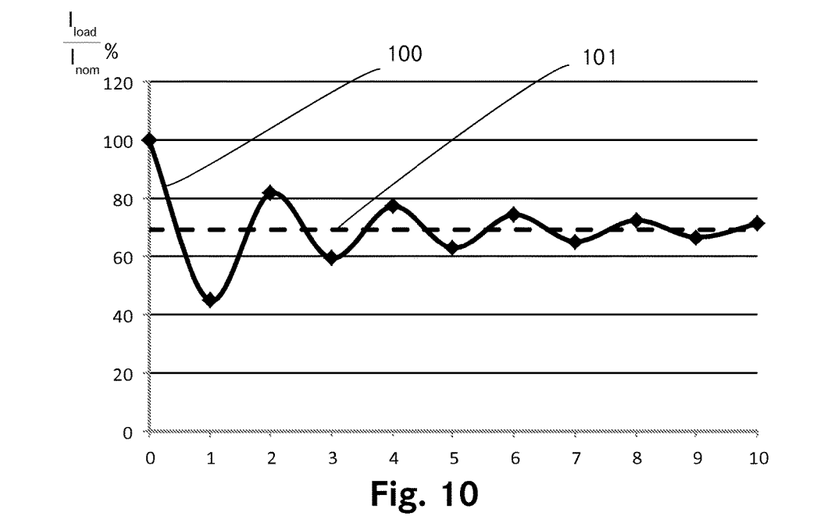
FIG. 10 Transient response of the load current according to the example shown in FIG. 9.

FIG. 10 shows the transient response 100 of the load current $I_{load}$ which corresponds to the load current transitions drafted in the phase space diagram of FIG. 9. As can be seen, the current is oscillating around the steady state point 82 (FIG. 9) while slowly converging to the steady state current $I_{limit}$, its level being indicated by a dashed line 101. The behaviour depends very much on the gradient of the load current limiting characteristics 70 and the algorithm is subject to become unstable if the gradient 73 of the limiting characteristics 70 is increased.

In another embodiment, intermediate load current reference values are generated in contrast to the precedent example. Starting from the same initial condition as in the precedent example with a load current $I_{load}$, which equals the nominal load current $I_{nom}$ and an output voltage $U_{out}$ of 251 V, the corresponding load current limit $I_{load,lim}$ for the first step is again 45%. In contrast to the precedent embodiment we do not reduce the load current reference value $I_{load,ref}$ directly to 45% of the nominal load current $I_{nom}$, but we set the load current reference value $I_{load,ref}$ to an intermediate value between the actual load current $I_{load}$ and the load current limit $I_{load,lim}$ which corresponds to the actual voltage output $U_{out}$. In this embodiment we obtain the intermediate value of the load current reference value $I_{load,ref}$ by calculating the new current reference value by using a weighted averaging function, the load current reference value $I_{load,ref}$ for step n can for instance be calculated as:

$$I_{load,ref}(n) = \frac{1 \cdot I_{load}(n) + 2 \cdot I_{load,lim}(U_{load}(n))}{3}$$

Figure 11:
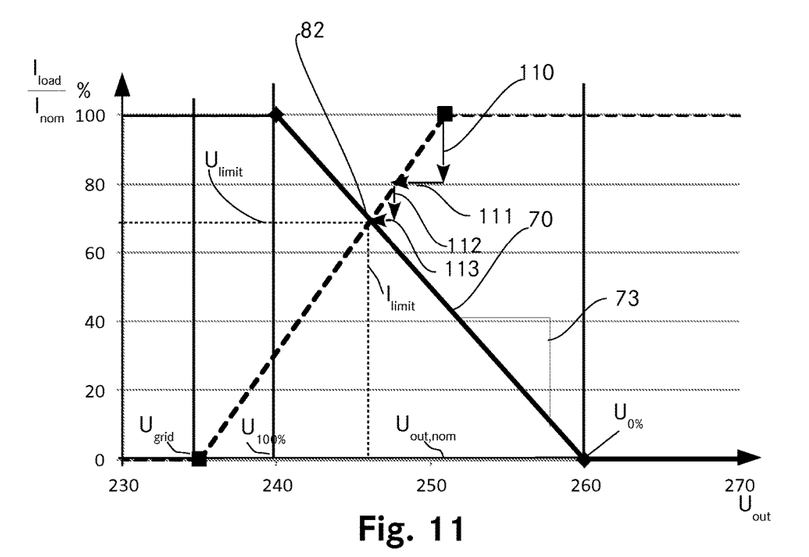
FIG. 11 Phase space diagram of load current and output voltage illustrating another embodiment of the operation method according to the invention.

FIG. 11 shows the corresponding phase space diagram with the transitions of the load current $I_{load}$ and the output voltage $U_{out}$ for different steps. In the first step, the load current reference $I_{load,ref}$ will be reduced to approximately 82% of the nominal load current $I_{nom}$ (transition 110), yielding to an output voltage $U_{out}$ of approximately 248 V (transition 111). For this output voltage $U_{out}$ the corresponding load current limit $I_{load,lim}$ is 60% of the nominal load current $I_{nom}$. The actual load current $I_{load}$ being 82% of the nominal load current $I_{nom}$, the new load current reference value $I_{load,ref}$ will be 74% of the nominal load current $I_{nom}$ (transition 112). The reduced load current $I_{nom}$ yields to a further reduction of the output voltage $U_{out}$ to approximately 247 V (transition 113) which is already close to the steady state point 82 with the values $I_{limit}$=69.45 A and $U_{limit}$=246.11 V.

Figure 12:
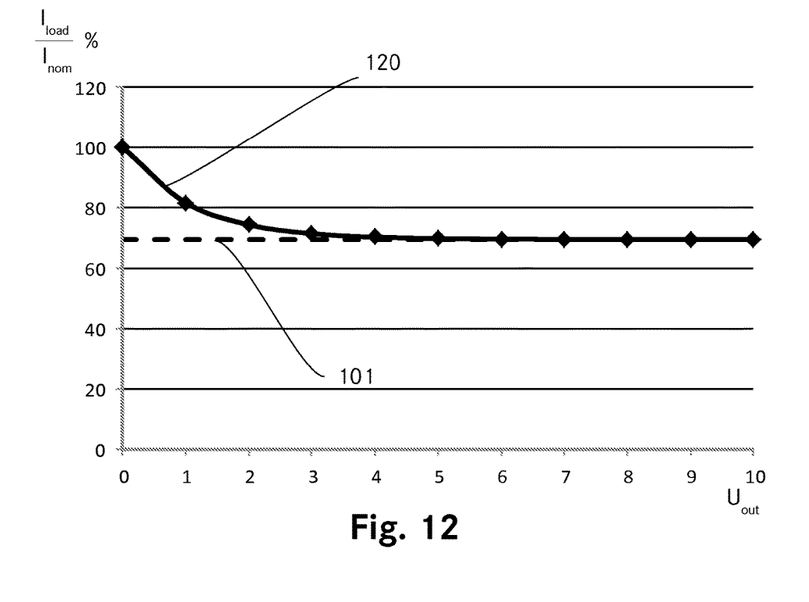
FIG. 12 Transient response of the load current according to the example shown in FIG. 11.

FIG. 12 shows the transient response 120 of the load current $I_{load}$ which corresponds to the load current $I_{load}$ transitions drafted in the phase space diagram of FIG. 11. As can be seen, the load current $I_{load}$ is converging without overshoot to the steady state point 82, the steady state load current $I_{limit}$ being indicated by a dashed line 101. The behaviour depends very much on the gradient 73 of the load current limiting characteristics 70 and the algorithm is subject to become unstable if the gradient is increased.

In a further improved embodiment of the invention, the intermediate load current reference value is calculated by the formula:

$$I_{load,ref} = \left(1 - \frac{U_{out} \cdot I_{nom} - U_{100\%} \cdot I_{load}}{U_{out} \cdot I_{nom} + (U_{0\%} - U_{100\%}) \cdot I_{load}}\right) \cdot I_{nom}$$

Figure 13:
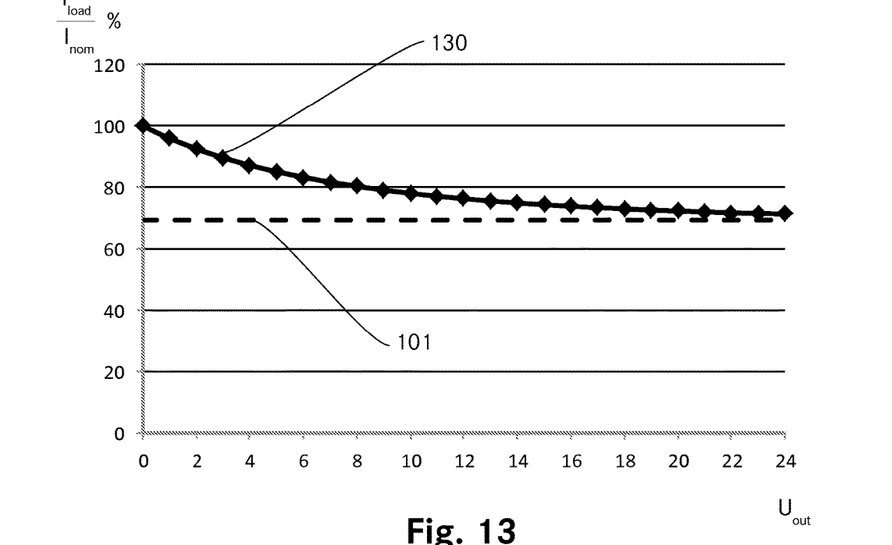
FIG. 13 Transient response of the load current of another preferred operation method according to the present invention.

The equation is obtained when calculating the intersection point (and therefore the steady state point 82) of the current limiting characteristics 70 and load current characteristics by assuming that the grid voltage $U_{grid}$ equals 0 V. FIG. 13 shows the transient curve 130 of the load current $I_{load}$. The load current $I_{load}$ is converging slowly and without overshoot towards its steady state value ($I_{limit}$), being indicated by a dashed line 101. The advantage of this embodiment is, that it is stable independently of the selected current limiting characteristics 70 and of the given output voltage $U_{out}$ to load current $I_{load}$ characteristics 81.

Figure 14:
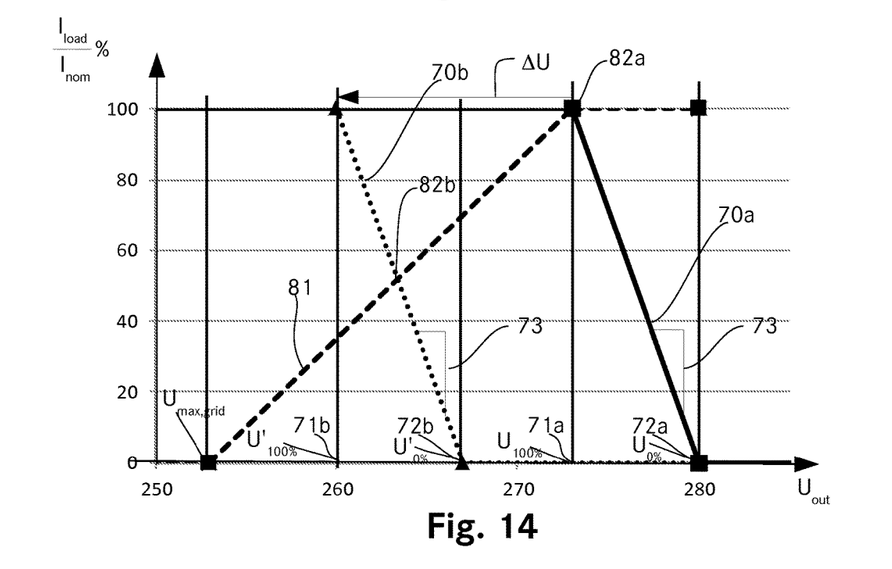
FIG. 14 Example of adaption of limiting characteristics to the load current.

FIG. 14 shows another embodiment of the invention. In this embodiment the first and the second voltage level are shifted, in dependency of the load current respectively with the load current dependent voltage limit $U_{out,lim}$. The dashed line shows the load current characteristics 81, representing the dependency between the output voltage $U_{out}$ of the power converter 1 and the load current $I_{load}$. FIG. 14 further shows the limiting characteristics for two different load currents. The full line shows the limiting characteristics 70a for a load current $I_{load}$ which is 100% of the nominal current $I_{nom}$ while the dotted line shows the limiting characteristics 70b for a load current which is 50% of the nominal current $I_{nom}$. The limiting characteristics 70a, 70b are shifted in function of the load current $I_{load}$, respectively their first voltage levels 71a, 71b ($U_{100\%}$, $U'_{100\%}$) and their second voltage levels 72a, 72b ($U_{0\%}$, $U'_{0\%}$) are shifted in dependency of the voltage limit $U_{out,lim}$. In this example the first voltage level $U_{100\%}$ is chosen that it coincides with the output voltage $U_{out,nom}$ of the inverter at the nominal current $I_{nom}$ at the maximum allowed grid voltage $U_{max,grid}$. The intersection point 82a of the load current characteristics with the limiting characteristics for nominal load current $I_{nom}$ has the coordinates ($U_{100\%}(I_{nom})$; $I_{nom}/I_{nom}$). The second voltage limit 72a is chosen that the gradient 73 of the voltage limiting characteristics is steeper than the gradient of the load current $I_{load}$ characteristics 81. Such, that in the case that the grid voltage $U_{grid}$ increases over the maximum allowed grid voltage $U_{max,grid}$, the load current $I_{load}$ will be reduced faster, preventing an overvoltage and a switch off of the power inverter 1. The load current will be reduced fast enough, such that the reduction of the output voltage $U_{out}$ due to the reduced load current $I_{load}$ will be greater than the reduction of the voltage limit $U_{out,lim}$, which is also linked to the load current $I_{load}$.

With a decreasing/increasing load current $I_{load}$ the first voltage and the second voltage level are shifted towards a lower/higher voltage. In the example of FIG. 14, both voltage levels are shifted by the same amount $\Delta U$ such that at a load current $I_{load}$ of 0 A the second voltage level $U_{0\%}$ coincides with the maximum allowed grid voltage $U_{grid,max}$:

$$\Delta U = (U_{out,max} - U_{grid,max}) \cdot \frac{I_{load}}{I_{nom}}$$

In the present example the first voltage level $U_{100\%}$ is shifted by −13.5V from the first voltage level 71a to another first voltage level 71b when decreasing the load current to 50% of the nominal load current $I_{nom}$. Similarly the second voltage level $U_{0\%}$ is shifted by −13.5V from the second voltage level 72a to another second voltage level 72b.

The intersection point 82a for the nominal load current $I_{nom}$ with the coordinates (273V; 100%) is moved to a new intersection point 82b having the coordinates (263V; 50%). With an increasing load current, the first and the second voltage level will move towards a higher voltage.

Figure 15:
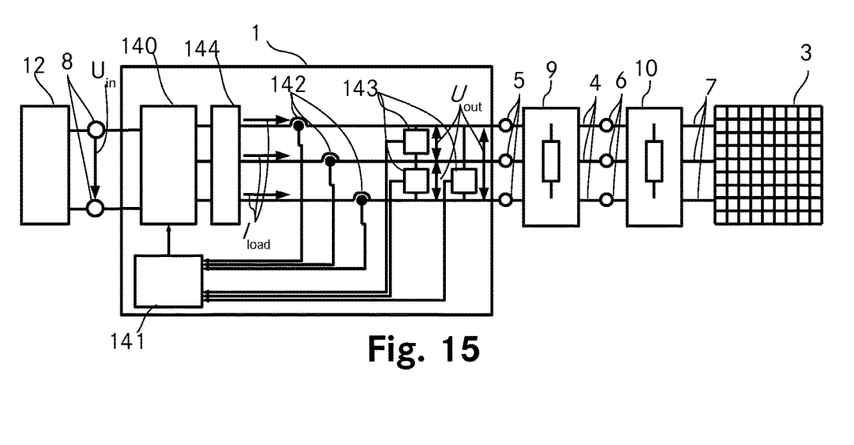
FIG. 15 Schematic diagram of an embodiment of a power converter feeding a load according to the present invention.

FIG. 15 shows schematically a power converter 1 according to the invention, feeding a three phase load current $I_{load}$ into a grid 3. In this embodiment, the power converter 1 is fed by a DC voltage source 12, for instance a photovoltaic system, which is connected to the input 8 of the power converter 1. The power converter 1 outputs a three phase load current $I_{load}$ into the grid 3, the load current $I_{load}$ being an AC current. The line, where the load current $I_{load}$ is fed into the grid can be split in two parts: a dedicated three-pole lead wire 4, which connects the output 5 of the power converter 1 to the grid connection point 6 and a grid side connection network 7, which connects the grid connection point 6 to the grid 3. The line impedance of the three-pole lead wire can be represented by a lumped three-phase line impedance 9, the line impedance of the grid side connection network 7 by a lumped three phase grid side line impedance 10.

The power converter 1 comprises a three phase bridge 140 implemented using six high speed switches, typically IGBT or MOSFETs, which is connected to the input 8 to the power converter. The switches are pulse-width-modulated (PWM) to impress the load current $I_{load}$ via a filter module 144 into the grid 3. The power converter further comprises a current controller 141 which controls the switches impressing the currents into the grid 3. The current controller 141 is connected to three load current sensors 142, preferably hall-effect-sensors, each of them measuring the load current $I_{load}$ of one the three phases connecting the power converter 1 to the grid at the grid connection point 6. The current controller is also connected to three output voltage sensors 143, each of them connected between two phases of the three phase lead wires 4. The current controller 141 preferably comprises a micro-controller which controls the switches of the three phase bridge 140.

In summary, it is to be noted that the invention creates a method for operating a power converter feeding a load current into a grid, which enables to compensate the influence of the line impedance between the output of the power converter and the grid. By adjusting the voltage limit to the load current it allows the efficient use of the available output power of the converter while avoiding additional hardware costs.

It is also to be noted that, with the load current reduction in function of the output voltage, an operation method is provided. It allows a continuous operation of the power converter even when operating with an output voltage close to maximum limits as for example the maximum output voltage or the voltage limit. By preventing that the power converter will be switched off and has to be reconnected to the grid, the power converter can work more reliably and more efficiently.

The invention claimed is:

1. Method for operating a power converter that delivers output current into a grid, including the steps of
   a) determining the output current of the power converter,
   b) monitoring an output voltage of the power converter;

c) controlling the output current in order to prevent the output voltage from exceeding an output voltage limit,
d) adjusting the output voltage limit to compensate for a voltage variation due to a line impedance of a line between the power converter and the grid, wherein the output voltage limit can be higher than a maximum voltage allowed at the grid without the output voltage exceeding the output voltage limit thereby allowing an efficient use of an available output power of the power converter in a wider operating range.

2. Method according to claim 1, wherein adjusting the voltage limit, includes the steps of
a) determining a voltage correction value,
b) adding the voltage correction value to a grid voltage limit.

3. Method according to claim 2, wherein the voltage correction value is determined by estimating a voltage drop due to a line impedance of a line between the power converter and the grid.

4. Method according to claim 3 wherein estimating the voltage drop includes the steps of
a) injecting test currents into the line and
b) measuring the output voltage of the power converter for each test current,
c) identifying the line impedance of the line between the power converter and the grid.

5. Method according to claim 4 wherein the voltage drop is estimated as linear dependent on the load current.

6. Method according to claim 4, in that at least one test current is zero.

7. Method according to claim 6, where the steps of injecting three consecutive test currents at equally spaced time intervals,
a) the first test current being zero,
b) the second test current being between 60% to 95% of the load current before the test,
c) the third test current being zero,
d) the time intervals between the test currents being chosen to be in the range of 10 ms to 2500 ms.

8. Method according to claim 2, wherein the voltage correction value is scaled such that the output voltage does not exceed a maximum output voltage of the power converter.

9. Method according to claim 1, wherein the output voltage limit is adjusted in dependency of the output current to compensate for the voltage variation.

10. Method according to claim 1, wherein feedback control is applied to the output current based on a current reference.

11. Method for operating a power converter having an output for feeding a load current into a grid, including the steps of
i) determining the load current at the output of the power converter,
ii) monitoring an output voltage of the power converter,
iii) controlling the load current, to avoid that the output voltage exceeds a voltage limit,
iv) adjusting the voltage limit in dependency of the load current, wherein controlling the load current includes the step of defining a limiting characteristics of the load current in dependency of the output voltage, the limiting characteristics
a) being equal to a nominal load current, below a first output voltage level,
b) having a negative gradient between a first output voltage level and a second output voltage level,
c) covering a load current value range between zero and the nominal load current,
d) being zero above the second output voltage level,
e) wherein the first output voltage level being smaller than the second output voltage level,
f) the second output voltage level being equal or smaller than a maximum output voltage.

12. Method according to claim 11, wherein the limiting characteristics between the first output voltage level and the second output voltage level is chosen to be linear.

13. Method according to claim 12, wherein controlling the load current includes the step of adjusting the load current stepwise to meet the limiting characteristics by generating intermediate load current reference values.

14. Method according to claim 13, wherein the intermediate load current reference values $I_{load,ref}$ are determined by the formula:

$$I_{load,ref} = \left(1 - \frac{U_{out} \cdot I_{nom} - U_{100\%} \cdot I_{load}}{U_{out} \cdot I_{nom} + (U_{0\%} - U_{100\%}) \cdot I_{load}}\right) \cdot I_{nom},$$

$U_{100\%}$ being the first output voltage level, $U_{0\%}$ being the second output voltage level, $I_{load}$ being the actual load current, $U_{out}$ the actual output voltage, and $I_{nom}$ the nominal load current of the power converter.

15. Method according to claim 11, wherein the first voltage level and the second voltage level are adapted in dependency of the voltage limit.

16. A power converter having an output for connecting to a grid, including a load current sensor, an output voltage sensor and a load current controller, where the power converter is adapted to feed a load current into a grid by
a) determining the load current at the output of the power converter,
b) monitoring the output voltage of the power converter,
c) controlling the load current to avoid that the output voltage exceeds a voltage limit, characterized in that the power converter is adapted to
d) adjust the voltage limit in dependency of the load current to compensate for a voltage variation due to a line impedance of the line between the power converter and the grid.

17. Method for operating a power converter having an output for feeding a load current into a grid, including the steps of
a) determining the load current at the output of the power converter,
b) monitoring an output voltage of the power converter,
c) controlling the load current at the output of the power converter to avoid that the output voltage exceeds an output voltage limit,
d) adjusting the output voltage limit to be higher than a maximum voltage allowed at the grid in dependency of the load current determined at the output of the power converter thereby allowing an efficient use of an available output power of the power converter in a wider operating range, wherein the output voltage limit is adjusted to compensate for a voltage variation due to a line impedance of a line between the power converter and the grid.

* * * * *